United States Patent [19]

Gantenbein

[11] Patent Number: 5,676,858
[45] Date of Patent: Oct. 14, 1997

[54] ROLLER SEAM WELDING PROCESS AND ELECTRODE ROLLER HEAD MOUNTING ON A RESISTANCE SEAM WELDING MACHINE

[75] Inventor: Rainer Gantenbein, Neuenhof, Switzerland

[73] Assignee: Elpatronic AG, Zug, Switzerland

[21] Appl. No.: 555,490

[22] Filed: Nov. 8, 1995

[30] Foreign Application Priority Data

Nov. 28, 1994 [CH] Switzerland ............... 03576/94

[51] Int. Cl.⁶ ................................ B23K 11/06
[52] U.S. Cl. .................... 219/64; 219/61.4; 219/84
[58] Field of Search .............. 219/59.1, 61.4, 219/64, 67, 81, 83, 84; 228/17, 17.5

[56] References Cited

U.S. PATENT DOCUMENTS

| | | | |
|---|---|---|---|
| 1,553,727 | 9/1925 | Sjobring et al. | 219/61.4 |
| 3,150,249 | 9/1964 | Brown | 219/64 |
| 4,150,277 | 4/1979 | Schalch et al. | 219/81 |
| 4,332,994 | 6/1982 | Opprecht | 219/64 |
| 4,559,431 | 12/1985 | Matsuno et al. | 219/84 |
| 5,159,168 | 10/1992 | Portmann et al. | 219/84 |

FOREIGN PATENT DOCUMENTS

| | | |
|---|---|---|
| 0 121 859 | 10/1984 | European Pat. Off. |
| 0 459 091 | 12/1991 | European Pat. Off. |
| 375 176 | 2/1919 | Germany |
| 187561 | 11/1922 | United Kingdom |

*Primary Examiner*—Teresa J. Walberg
*Assistant Examiner*—J. Pelham
*Attorney, Agent, or Firm*—McCormick, Paulding & Huber

[57] ABSTRACT

The lower welding wheel (2) of a resistance seam welding machine is vertically adjusted by providing retaining pieces (10) for the stator (8) of the electrode roller head, which are able to position the electrode wheel head in different vertical settings on the welding arm (1) of the machine. This makes it possible to eliminate the vertical adjustment for the guide piece (4), allowing welding to be carried out more accurately.

4 Claims, 1 Drawing Sheet

200~# ROLLER SEAM WELDING PROCESS AND ELECTRODE ROLLER HEAD MOUNTING ON A RESISTANCE SEAM WELDING MACHINE

BACKGROUND OF THE INVENTION

The invention relates to a process for the roller seam welding of containers, in particular cans, in which the lower electrode roller head of the resistance seam welding machine is periodically remachined and its diameter is thereby reduced. The invention also relates to a mounting for the stator of an electrode wheel head in the welding arm of a resistance seam welding machine.

In known roller seam welding of can bodies, welding is performed by means of an upper electrode roller head and a lower electrode roller head, in each case with an interposed wire electrode. Such an electrode roller head is known e.g. from EP-A 459091. The lower electrode roller head is mounted in a welding arm of the welding machine, which is encircled by the can bodies as they are fed into the machine. The can body is fed to the welding zone via a so-called Z-rail which forms the overlapping seam, and a head piece. The lower electrode roller head of the welding machine is periodically remachined to correct for wear and contamination sustained in operation. The diameter of the electrode roller head is reduced in this remachining process. In order to compensate for this, it is known to adjust the height of the head piece, or to tilt it. It is apparent, however, that this can cause a reduction in weld quality.

SUMMARY OF THE INVENTION

An object of the invention is to improve the process so that more uniform weld quality can be obtained.

In the process of the above-mentioned kind this is accomplished by repositioning the electrode wheel head vertically with respect to the longitudinal axis of the welding arm of the welding machine following remachining of the electrode roller head.

It has been shown that improved weld quality can be obtained by vertically displacing the electrode roller head rather than by tilting the guide head. This is explained by the fact that tilting the guide head as has been the practice until now causes the can body to be fed at a slight angle, which displaces the welding plane, possibly affecting welding parameters. The vertical adjustment of the electrode roller head avoids this.

It is also an object of the invention to provide a mounting for the electrode roller head stator by means of which the weld quality can be improved.

The vertical adjustment is preferably made by means of exchangeable mounting plates with a defined height for the stator. This completely eliminates the need for fine adjustments. Also, it is preferable for one mounting plate to be arranged in a cover which is detachable from the welding arm and which allows the electrode roller head to be taken out laterally.

BRIEF DESCRIPTION OF THE DRAWINGS

Embodiments of the invention will now be described in detail by way of example, with reference to the drawings, in which.

DESCRIPTION OF THE PREFERRED EMBODIMENTS

Figure 1:
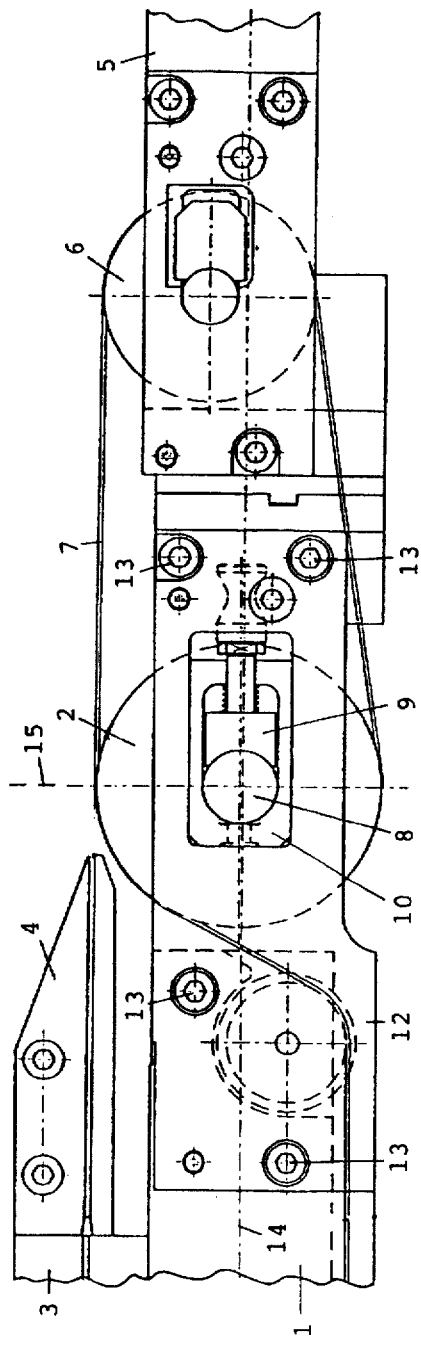
FIG. 1 shows part of the lower welding arm of the resistance seam welding machine, in elevation.

FIG. 1 shows in elevation the lower welding arm 1 of the resistance seam welding machine which is known in itself, and other details of which have been omitted. The lower electrode roller head 2 is mounted on the lower welding arm 1. The drawing does not show the upper electrode roller head, which is arranged above the lower electrode roller head 2 so that a can body with an overlapping seam is guided in a known manner through the Z-rail 3 and the guide head 4 into the welding zone between the lower and upper electrode roller heads. Welding of the seam is then effected by the upper electrode roller head acting from the outside and by the lower electrode roller head 2 acting from the inside, in both cases with interposition of a wire electrode, that of the lower electrode roller head 2 being illustrated in the drawing and designated 7. In the example shown in FIG. 1, the wire electrode 7 passes over a supplementary roller 6. However, this supplementary roller may be omitted, so that the wire electrode 7 wraps around the lower electrode roller head 2. The lower welding arm 1, as known, may connect to a device 5 for coating the internal welded seam of the can. This device is known, and is therefore not described in detail here.

Figure 2:
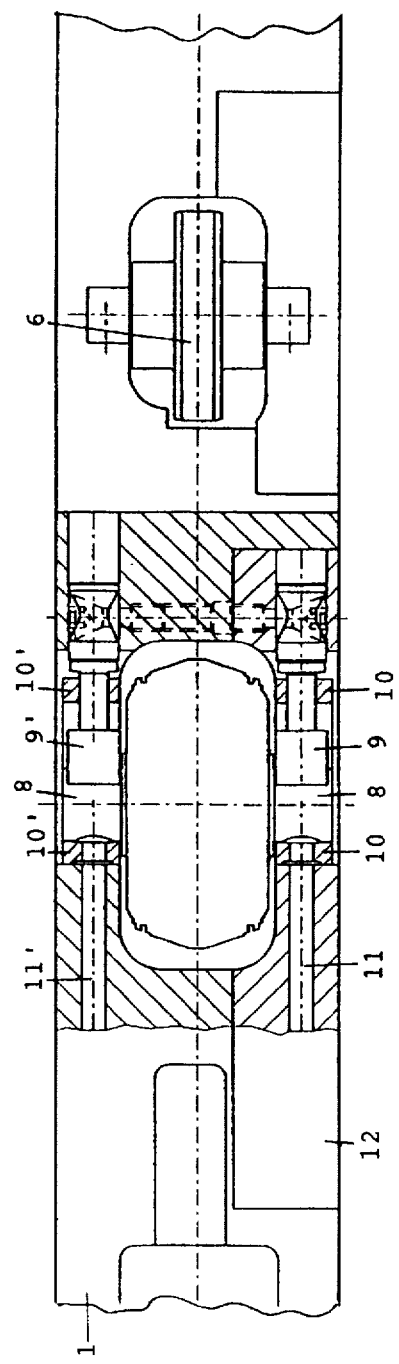
FIG. 2 is a plan view, partly in section, of the welding arm shown in FIG. 1.

The lower electrode roller head 2 may be e.g. an electrode roller head as described in EP-A 459091. In this case the electrode roller head has a stator 8 gripped in the lower welding arm. It is gripped by adjustable jaws 9 acting on the stator from one side. In the example shown, the stator is also held in two mounting plates or retaining pieces 10 and 10' (FIG. 2) which determine the vertical position of the welding roller 2. The retaining piece 10 or 10', which is shown separately in FIG. 4, has a slot 16 one wall portion of which matches the shape of the bearing journal of the stator 8. For its part, the retaining piece 10 or 10' is inserted in a slot in the welding arm 1, or in a slot in a cover 12 which is releasably fastened to the welding arm by stud bolts 13. The position of the slot within the retaining piece 10 is made such that the can body emerging from the guide piece 4 moves in a straight path into the welding zone between upper and lower welding wheels, so that welding takes place in the welding plane 15 perpendicular to the plane of the drawing.

As already mentioned, the remachining of the lower welding roller 2 which becomes necessary from time to time causes its diameter to be reduced. Hitherto this has been compensated by slightly tilting the guide piece 4. The invention proceeds in another way, viz. by adjusting the vertical position of the lower welding roller. In the illustrated example this is done by replacing the retaining pieces 10 and 10', so that the new retaining pieces 10 and 10' inserted in place of the former retaining pieces 10 and 10' have a slot for the journals of the stator 8 which is displaced upwards by an amount corresponding to the reduction in diameter, so that the welding roller is shifted upwards. As a result, the can bodies are inserted into the welding zone in an exactly straight line, and welding occurs precisely in the welding plane 15, resulting in constant weld quality in spite of the remachining of the electrode roller head 2.

Replacement of the retaining pieces 10 and 10' together with removal and refitting of the electrode roller head 2 is particularly easy if the welding arm is provided with the above-mentioned cover 12 which carries one retaining piece 10 and forms a support for the electrode roller head. The cover can be removed by unscrewing the stud bolts 13, allowing the electrode wheel head to be removed laterally from the welding arm. This also gives access to the rear retaining piece 10', which can be exchanged for another retaining piece 10' with its slot in a higher position. The front retaining piece 10 which fits in the cover can likewise be exchanged easily. The retaining pieces are also provided with a passageway extending in the longitudinal direction, through which coolant can be conveyed to and from the electrode wheel head stator 8 via the conduits 11 and 11' in the welding arm, as is known in itself.

Figure 4:
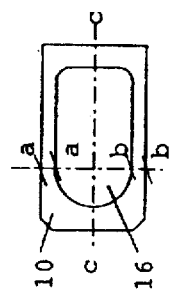
FIG. 4 shows a retaining piece for the electrode roller head stator.
Figure 3:
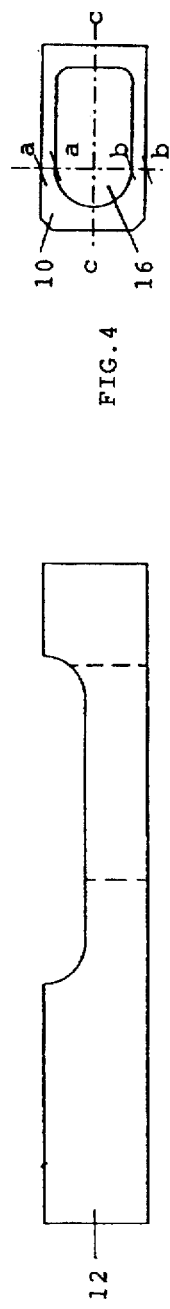
FIG. 3 is a view of the cover arranged on the welding arm shown in FIGS. 1 and 2.

The retaining piece 10 shown in FIG. 4 has a slot wall which matches the shape of the stator journal. The distances a—a and b—b on the retaining piece are precisely defined, so that the electrode roller head 2 is set at a predetermined height. When replacing the retaining piece in order to reset the height of the electrode roller head, it is possible either to insert a new retaining piece 10 on which the distances a—a and b—b are different, or to reuse the retaining piece 10, rotating it about the axis c—c so that the distance a—a is at the bottom and the distance b—b is at the top. Retaining pieces 10 can then be used for two different electrode roller head positions, provided the distances a—a and b—b are not equal. In each case, a stepwise adjustment of the roller head takes place.

The height adjustment of the electrode roller head is preferably made in the manner which has been described by means of the retaining pieces 10 and 10'. The height adjustment can of course also be made in other ways, e.g. by a bearing whose height can be adjusted by means of a screw in the welding arm. However, it has been found that adjusting the height by means of retaining pieces is easier to manage in practice.

I claim:

1. Process for the roller seam welding of containers using a resistance seam welding machine having an electrode roller head arranged in a welding arm of the machine, the welding arm having a longitudinal axis, the electrode roller head having an axis of rotation transverse to the longitudinal axis, comprising the steps of:

periodically removing the electrode roller head from the welding arm and remachining the electrode roller head of the resistance seam welding machine, the diameter of the electrode roller head being reduced during remachining; and replacing the electrode head in the welding arm after remachining with the axis of rotation repositioned with respect to the longitudinal axis of the welding arm of the welding machine by means of exchangeable retaining elements that shift the axis of rotation in a stepwise manner, to compensate for the reduction in electrode roller head diameter due to remachining.

2. Mounting for the stator of an electrode roller head in the welding arm of a resistance welding machine, the welding arm having a longitudinal axis and the stator defining an axis of rotation of the electrode roller head extending transverse to the longitudinal axis, characterized by the mounting having exchangeable retaining pieces for retaining the stator in the welding arm in a transversely adjustable and stepwise manner with respect to the longitudinal axis of the welding arm.

3. Mounting according to claim 2, wherein the welding arm has a fixed portion and a cover which is detachable from the fixed portion, a first retaining piece is arranged in the fixed portion of the welding arm and a second retaining piece is arranged in the cover.

4. Process according to claim 1 in which the welding arm also has a fixed portion and a cover detachably mounted to the fixed portion, further comprising the step of:

positioning a first retaining piece in the fixed portion and a second retaining piece in the cover.

* * * * *